United States Patent Office 3,492,256
Patented Jan. 27, 1970

3,492,256
RESINOUS COATING COMPOSITIONS CONTAINING ALKYD-AMINE RESINS
Erwin J. Kapalko and Richard A. Martin, Delaware, Ohio, assignors to PPG Industries, Inc., a corporation of Pennsylvania
No Drawing. Filed Oct. 24, 1967, Ser. No. 677,717
Int. Cl. C08g 37/34, 45/14
U.S. Cl. 260—20                    13 Claims

ABSTRACT OF THE DISCLOSURE

Coating compositions having outstanding hardness, flexibility, durability, detergent resistance, and other improved properties are provided by a combination of an alkyd resin-aminoplast resin composition and an aromatic reaction product of an alkyl-substituted aromatic hydrocarbon-aldehyde condensate with a polyepoxide or a methylol phenol ether composition of the formula

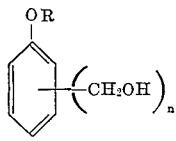

where $n$ is 1 to 3 and R is an unsaturated aliphatic group or a halogenated derivative of such a group. The alkyd resin is preferably oil-free but oil-modified alkyds are also useful. Aminoplasts made from benzoguanamine are preferred, as are aromatic reaction products made from xylene-formaldehyde condensates. The properties of these coating compositions make them highly useful on appliances such as laundry equipment.

---

Various compositions comprising alkyd resins in combination with aminoplasts have been utilized extensively in coatings. They provide hard and attractive coatings on various articles, such as appliances, automobiles, and the like, and being based upon a combination of two different resinous materials, the resultant coatings have properties which cannot be attained using either component alone. For this same reason, however, certain of the less desirable properties of the individual components are found in compositions based upon their blends.

However, although such alkyd-aminoplast compositions provide coatings having overall properties which make them desirable for many applications, they are subject to certain disadvantages. One especially troublesome property is detergent resistance, which means the ability to withstand hot solutions of detergents without degrading the coating or the substrate. Detergent resistance is an extremely important property in any coating for use on laundry equipment or other appliances.

It has now been found that coating compositions having particularly good properties, including unexpectedly outstanding detergent resistance, are obtained by combining the aforesaid alkyd-aminoplast compositions with an aromatic reaction product of an alkyl-substituted aromatic hydrocarbon aldehyde condensate with a polyepoxide or a composition consisting essentially of one or more methylol phenol ethers. Such coating compositions provide numerous advantages, including, as mentioned, exceptional detergent resistance, as well as improved adhesion to many substrates, good flexibility and better salt-spray resistance and, most significantly, provide these advantages without detracting from other necessary properties. The excellent properties of the coating compositions herein make them especially useful as primers and other coatings for washers, dryers, and other appliances in which such properties are required.

The alkyd resin-aminoplast resin compositions to which the instant invention is applicable include those containing various aldehyde condensation products of amino compounds such as melamine, urea, benzoguanamine and similar compounds. Generally, the aminoplast resin forms from about 5 per cent to about 60 per cent of the total weight of the alkyd resin and aminoplast resin.

Aminoplast resins produced from melamine, urea and benzoguanamine are most common and are preferred. However, condensation products of other amines and amides can also be employed, for example, those of triazines, diazines, triazoles, guanidines, guanamines, alkyl and aryl substituted derivatives of such compounds, including alkyl and aryl substituted ureas, and alkyl and aryl substituted melamines, provided at least one amino group is present. Some examples of such compounds are N,N'-dimethylurea, benzyl urea, dicyandiamide, formoguanamine, acetoguanamine, ammeline, 2 - chloro - 4,6-diamino - 1,3,5 - triazine, 6 - methyl - 2,4-diamino-1,3,5-triazine, 2-phenyl-4-amino-6-hydroxy-1,3,5-triazine, 3,5-diaminotriazole, triaminopyrimidine, 2-mercapto-4,6-diaminopyrimidine, 2,4,6 - trihydrazine-1,3,5-triazine, 2,4,6-triethyltriamino-1,3,5-triazine 2,4,6 - triphenyltriamino-1,3,5-triazine, and the like. Benzoguanamine-formaldehyde resins are generally preferable because they are more soluble in the solvents best employed in many commercial coating operations, and because the resultant coatings have an especially desirable combination of properties.

The aldehyde used in making the aminoplast is most often formaldehyde, although similar condensation products can be made from other aldehydes, such as acetaldehyde, crotonaldehyde, acrolein, benzaldehyde, furfural, and others.

These aldehyde condensation products contain methylol or similar alkylol groups, the structure of the alkylol group depending upon the particular aldehyde employed. At least a portion of these alkylol groups are preferably etherified by reaction with an alcohol to provide resins which are soluble in the desired solvent. Any monohydric alcohol can be employed for this purpose, including such alcohols as methanol, ethanol, propanol, butanol, pentanol, hexanol, heptanol, and other alkanols, usually having up to about 12 carbon atoms, as well as benzyl alcohol and other aromatic alcohols; cyclic alcohols, such as cyclohexanol; monoethers of glycols, such as the Cellosolves and Carbitols; and halogen-substituted or other substituted alcohols, such as 3-chloropropanol. Butanol and methanol are preferred etherifying alcohols.

The amine-aldehyde resin is produced in a manner well known in the art, using acidic or basic catalysts and varying conditions of time and temperature in accordance with conventional practice. The formaldehyde is often employed as a solution in water or alcohol, and the condensation, etherification and polymerization reactions may be carried out either sequentially or simultaneously.

Unmodified alkyd resins made from saturated polyols and acids, i.e. oil-free saturated polyesters, are preferred in formulating the compositions of the invention, although oil-modified alkyds can also be used. In general, there may be employed any of the saturated or unsaturated adkyd resins utilized in the coatings field, produced from any polybasic acid and polyfunctional alcohol. Thus, for example, the alkyd may be made from such polyfunctional acids as phthalic acid, maleic acid, fumaric acid, isophthalic acid, succinic acid, trimellitic acid, adipic acid, azelaic acid, sebacic acid, dinoleic acid, fatty acids, and the like, as well as from anhydrides of such acids. The polyfunctional alcohol can be, for example, glycerine, trimethylolethane, trimethylolpropane, pentaerythritol, sorbitol, mannitol, ethylene glycol, diethylene glycol, 2,3-butylene glycol, and similar polyols.

As indicated, the alkyd resin may be oil-modified or non-oil-modified. The oil, when one is utilized, can be a saturated oil, such as coconut oil, or drying or semi-drying oils, such as fish oils, linseed oil, soybean oil or the like, can be employed. If desired, the alkyd resin can contain a monobasic acid, such as benzoic acid, a substituted benzoic acid, or a similar monobasic aromatic acid.

Included within the scope of the term "alkyd resin" as used herein are reaction products of polybasic acids and polyfunctional alcohols as disclosed above, which are copolymerized with one or more other polymerizable ethylenically unsaturated monomers. Such monomers include esters of acrylic acid and methacrylic acid, acrylonitrile, olefinic hydrocarbons, and other such monomers containing a $CH_2=C<$ group.

In producing the compositions of the invention, the above alkyd-aminoplast compositions are combined with an aromatic reaction product of an alkyl-substituted aromatic hydrocarbon-aldehyde condensate and either a polyepoxide or a methylol phenol ether composition or both.

The aromatic hydrocarbon-aldehyde condensates employed in making these reaction products are produced from various alkyl-substituted aromatic hydrocarbons including toluene, ortho-, meta- and para-xylenes, ethylbenzene, alkylated naphthalenes, alkylated anthracene, etc. Xylene is the preferred aromatic hydrocarbon and is generally employed as the commerical mixture which contains the various isomers in combination. Formaldehyde is the preferred aldehyde used in making the condensate, but other aldehydes which can be employed include acetaldehyde, propionaldehyde, butyraldehyde, benzaldehyde, furfural, and the like. The polyepoxides which can be used to react with the above condensate to provide the reaction products utilized in the invention include any epoxide compound or mixture which has a 1,2-epoxy equivalence of greater than 1.0. Such polyepoxides comprise a relatively large class of materials and have been described in numerous patents. Some of these patents are United States Patents Nos. 2,467,171, 2,615,007, 2,716,123, 3,030,336, 3,053,855, and 3,075,999.

The preferred polyepoxides employed in these reaction products are the polyglycidyl ethers of polyhydric compounds. These are prepared, for example, by reaction of the polyhydric compound with epichlorohydrin or dichlorohydrin in the presence of an alkali. One class of preferred polyhydric compounds are the polyphenols, and particularly Bisphenol A (para, para'-isopropylidenediphenol). Other phenolic compounds that can be utilized include 4,4' - dihydroxy - benzophenone, bis(4 - hydroxyphenyl)-1-1-ethane, bis(4-hydroxyphenol)-1-1-isobutane, bis(4-hydroxy-tertiary-butylphenyl)-2-2-propane, bis(2-hydroxynaphthyl)methane, or a novolak resin or similar polyphenol resin. Other polyhydric compounds that can be utilized include polyhydric alcohols such as ethylene glycol, diethylene glycol, triethylene glycol, 1,2-propylene glycol, 1,4-butylene glycol, 2,4,6-hexanetriol, glycerol and the like.

In addition to the foregoing polyglycidyl ethers of polyhydric compounds, other polyepoxides than can be employed include polyglycidyl esters of polycarboxylic acids, which can be produced by the reaction of epichlorohydrin or other epoxy compounds with an aliphatic or aromatic polycarboxylic acid such as oxalic acid, succinic acid, adipic acid, phthalic acid, dimerized linolenic acid and the like. Diglycidyl adipate and diglycidyl phthalate are examples.

Still other useful polyepoxides are derived from the epoxidation of an olefinically unsaturated alicyclic compound. These can be diepoxides and higher epoxides as well as mixtures of epoxides. They can be obtained, for example, by epoxidation of alicyclic olefins with oxygen and selected metal catalysts, or by reaction with acetaldehyde monoperacetate, or by epoxidation using peracetic acid. Examples of such polyepoxides are described in U.S. Patents Nos. 2,716,123, 2,786,066 and 2,786,067.

Alternatively or in combination with the polyepoxide, suitable aromatic reaction products are produced by reacting the condensate with a methylol phenol ether composition consisting essentially of one or more methylol phenol ethers of the formula.

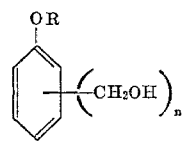

where $n$ is an integer from 1 to 3 and R is an unsaturated aliphatic group or a halogen-substituted unsaturated aliphatic group. The groups represented by R should contain at least 3 carbon atoms and can be, for example, allyl groups (which are preferred) or others such as methallyl, crotyl, butenyl, or the like. The halogen-substituted unsaturated groups represented by R can be various mono- and poly-halogenated derivatives of the above unsaturated aliphatic groups, for example, 2-chloroallyl, 3-chloroallyl, 3-chloro-2-methallyl, 1-chloro-2-butenyl, and corresponding groups containing halogens such as bromine or fluorine.

The methylol phenol ether compositions employed herein are described in U.S. Patent 2,579,330, and as disclosed therein can be produced from sodium or barium salts of 2,4,6-tris(hydroxymethyl)phenols which are obtained by reacting formaldehyde with phenol in the presence of sodium or barium hydroxide. Several methylol phenol ether compositions of this type are commercially available and these generally comprise mixtures of allyl ethers of mono-, di- and trimethylol phenols (substituted in the ortho, para and meta positions). The trimethylolated derivative is generally the predominant component of the composition. Such commercially available methylol phenol ether compositions are preferred for use in the invention.

The proportions of aromatic hydrocarbon-aldehyde condensate and polyepoxide and/or methylol phenol ether composition used to prepare the aromatic reaction products can be varied but ordinarily the aromatic hydrocarbon-aldehyde resin forms from about 30 to about 70 percent by weight of the total weight of the aromatic reaction product. Reaction products made from approximately equal weights of the reactants are generally preferred.

The aromatic reaction products are ordinarily produced by combining the components, usually in the presence of an acid catalyst and generally at elevated temperatures, e.g. from about 100° C. to about 180° C. In some cases, and particularly using methylol phenol ether compositions, heating is not always necessary.

The aromatic reaction products employed herein are largely described in U.S. Patent No. 2,825,712. Several such reaction products are available commercially, these being in most cases either a reaction product of xylene-formaldehyde resin with an epichlorohydrin-Bisphenol A polyepoxide or a reaction product of xylene-formaldehyde resin with a mixture of allyl ethers of mono-, di-, and trimethylol phenols. The commercially available aromatic reaction products are preferred for use in the present invention.

In formulating the coating composition, the proportions of the aromatic reaction product and the alkyd-aminoplast composition can be varied considerably and the optimum amounts employed depend upon the particular properties desired in the product and also depend in part upon the particular alkyd and aminoplast employed. In most instances, compatibility of the components must be considered although for some purposes some degree of incompatibility can be tolerated. In the preferred products, the methylol ether composition comprises from about 3 to about 25 percent of the total weight of the aromatic reaction product, the alkyd and aminoplast, although as little as 1 percent gives some degree of improvement in properties and as much as 40 percent or even higher can be utilized in some cases.

In the ordinary case the alkyd-aminoplast composition is first produced and then combined with the aromatic reaction product. Heating of the mixture can be carried out although it is not known with certainty whether any coreaction takes place between these components, but some reaction may take place either prior to or during curing. It is also possible to add the aromatic reaction product during the preparation of the alkyd-aminoplast composition, and thereby provide additional opportunity for some degree of interreaction. Also, if desired the alkyd and/or the aminoplast resin can be modified so as to provide reactive sites which can more easily react with the aromatic reaction product.

In addition to the alkyd-aminoplast composition and the aromatic reaction product, the coating compositions herein ordinarily contain several additive components to provide the desired overall combination of properties. Such additive materials can include, for instance, stabilizers, plasticizers, and materials to decrease the required curing temperatures. Various pigments are also usually included to provide colored finishes as desired.

The coating compositions described herein are particularly useful as thermosetting coatings for appliances such as laundry equipment, where detergent resistance is an important property. In addition, they have good adhesion, flexibility, impact resistance, and chemical resistance. These coating compositions are especially useful as topcoats or as one coat finishes, because they have excellent resistance to yellowing during baking and therefore provide especially desirable results where a white finish is desired. They can also be used as a primer, however, with virtually any topcoat material. Because of their resistance to yellowing, they can be used as a "flash" primer, i.e., applied and topcoated without prior baking of the primer.

The coating compositions herein can be applied by any conventional application method, such as by electrostatic or conventional spraying, roll coating, brushing and the like. Ordinarily, the composition will include one or more solvents, and the choice of solvents and the concentration of the resinous components in the solvent mixture are chosen with reference to the desired manner in which the composition is to be applied. They can be applied to various substrates, including various metals, such as steel, aluminum, treated steels, etc., as well as wood, glass, plastics and other substrates.

After application, the compositions are dried and baked at elevated temperatures to produce a hard, infusible film. The baking schedules employed also depend upon the nature of the particular composition, the nature of the substrate, and the manner in which it is to be used. The inclusion of an acid or addition of other curing agents can lower the effective curing temperature. Generally speaking, baking temperatures of at least about 325° F. and preferably at least about 350° F. are employed, and the ordinary baking schedule is between about 350° F. and about 375° F. for 20 to 30 minutes.

A typical composition of the invention is described below (all parts and percentages in the following example and throughout this specification are by weight and are based upon non-volatile solids content, unless otherwise indicated):

EXAMPLE

In this example, the alkyd-aminoplast composition employed contained an oil-free alkyd resin of the following composition:

| | Percent |
|---|---|
| Neopentyl glycol adipate | 10.44 |
| Neopentyl glycol isophthalate | 55.99 |
| Trimethylolpropane adipate | 22.17 |
| Excess trimethylolpropane | 11.40 |

This resin, as a 60 percent solution in a 90/10 mixture of xylene and butyl Cellosolve, was combined with a benzoguanamineformaldehyde resin which is substantially completely alkylated, containing methoxy and butoxymethyl groups, and which has the following properties:

| | | |
|---|---|---|
| Solids content (in 93/7 xylene-butanol mixture) | percent | 71 |
| Viscosity | centipoises | 200–400 |

The coating composition was produced by mixing 280 parts of the above alkyd resin solution, 101.5 parts of the above benzoguanamine-formaldehyde resin solution, and 72 parts of a butylated melamine-formaldehyde resin solution having the following properties:

| | | |
|---|---|---|
| Solids (in butanol) | percent | 50 |
| Acid number | | 8–12 |
| Specific gravity | | 0.98 |
| Viscosity (Gardner-Holdt) | | G–J |
| Mineral thinner tolerance (min.) | cc./g | 5–10 |

This mixture was blended with 15 parts of butyl Carbitol and 37 parts of butanol, and then there was added a mixture of 45 parts of diacetone alcohol and 55 parts of a commercially available aromatic reaction product known as Methylon 75202. It is a reaction product of xylene-formaldehyde resin and a polyepoxide made from Bisphenol A and epichlorohydrin, produced in accordance with U.S. Patent No. 2,825,716 (see Example 3). The solution of this reaction product in a solvent mixture of 2 parts of xylol, 2 parts of diacetone alcohol and 1 part of butyl Cellosolve has the following properties:

| | | |
|---|---|---|
| Solids content | percent | 65 |
| Viscosity (Gardner-Holdt) | | Z1–Z2 |
| Pounds per gallon | | 8.5–8.7 |

This mixture was then blended with a pigment paste containing 80 parts of the alkyd resin solution, 325 parts of titanium dioxide, 39 parts of xylene, 11 parts of diacetone alcohol and 5 parts of butanol.

The coating composition thus obtained was reduced to a viscosity of 25 seconds (#2 Zahn cup) with a 1 to 1 mixture of xylene and methyl ethyl ketone and applied to calcium-zinc phosphate treated steel panels to give a 1.2 to 1.5 mil thick dry film. For comparison, another such panel was coated with a coating composition made in the same manner and with the same resins except that the vehicle contained 60 percent alkyd resin and 40 percent aminoplast resin, with the aromatic reaction product omitted. Both panels were baked at 375° F. for 20 minutes and evaluated by a commercially used detergent resistance test in which the coating is exposed to a 1½ percent detergent solution in distilled water at 165° F. The coating made in accordance with the present invention had only slight blistering after 100 hours and was considered to satisfactorily pass the test for this period, whereas the comparison coating (without the aromatic reaction product) failed the test, being badly blistered and peeled with loss of adhesion after 48 hours.

Other tests have shown that the advantages of incorporation of aromatic reaction product in alkyd-aminoplast compositions as described are obtained not only with the compositions specifically exemplified but with other compositions employing, for instance, other aromatic reaction products of the class disclosed, as well as other alkyd resins and other aminoplast resins. Among the alkyd resins that can be utilized are oil-modified resins which are employed as in the above examples (with suitable changes in solvents being made as required). An example of such an oil-modified alkyd has the following composition:

| | Percent |
|---|---|
| Soya oil | 55.04 |
| Glycerol benzoate | 3.32 |
| Glycerol isophthalate | 46.16 |
| Excess glycerine | 1.48 |

Similarly, other aminoplast resins can be used, including melamine-formaldehyde and urea-formaldehyde resins. Hexakis(methoxymethyl)melamine is one example of such a melamine resin, and another is the butylated resin produced from the reaction of 6.0 moles of formaldehyde and 4.3 moles of butanol per mole of melamine. An example of a useful ureaformaldehyde resin is produced from 2.2 moles of formaldehyde and 1.6 moles of butanol per mole of urea.

An example of other aromatic reaction products is made by reacting 62.5 parts of an 80 percent solution in xylene of the xylene-formaldehyde resin used in the above example with 100 parts of a 50 percent solution in butanol of a mixture of the allyl ethers of mono-, di-, and trimethylol phenol (Methylon 75108). The product of this reaction carried out at 125° C. for one hour in the presence of a small amount of 85 percent phosphoric acid can be substituted for the aromatic reaction product in the foregoing example with good results as described.

Also, various proportions of the components can be utilized. For example, a coating composition was produced as in the above example except that the vehicle contained 80 percent of the alkyd resin, 15 percent of methylated hexamethoxymelamine (Cymel 301), and 5 percent of the aromatic reaction product composition (Metbylon 75202). When tested as above, the coating passed the above test for a period of 168 hours, whereas a corresponding coating made without the aromatic reaction product completely failed in this time.

According to the provisions of the patent statutes, there are described above the invention and what are now considered to be its embodiments. However, within the scope of the appended claims, it is to be understood that the invention can be practiced otherwise than as specifically described.

We claim:
1. A coating composition the resinous vehicle of which consists essentially of
   (1) an alkyd resin-aminoplast resin composition, and
   (2) from about 1 to about 40 percent, based on the total weight of (1) and (2) herein, of an aromatic reaction product of an alkyl-substituted aromatic hydrocarbon-aldehyde condensate with a member of the group consisting of (a) polyepoxides, and (b) compositions consisting essentially of one or more methylol phenol ethers of the formula

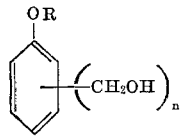

where $n$ is an integer from 1 to 3 and R is an unsaturated aliphatic group or a halogen-substituted unsaturated aliphatic group.

2. The composition of claim 1 in which said alkyd resin is oil-free.
3. The composition of claim 1 in which said alkyd resin is oil-modified.
4. The composition of claim 1 in which said aminoplast resin comprises a benzoguanamine-formaldehyde resin.
5. The composition of claim 1 in which said alkyd resin-aminoplast resin composition contains from about 5 to about 60 percent by weight of aminoplast resin.
6. The composition of claim 1 in which said aromatic reaction product is formed from a polyglycidyl ether of a polyhydric compound.
7. The composition of claim 6 in which said polyglycidyl ether is an epichlorohydrin-para, para′-isopropylidene-diphenol reaction product.
8. The composition of claim 1 in which said aromatic reaction product is formed from a methylol phenol ether composition.
9. The composition of claim 8 in which said methylol phenol ether composition consists essentially of a mixture of allyl ethers of mono-, di-, and trimethylol phenol.
10. The composition of claim 1 in which said aromatic reaction product is formed from a xylene-formaldehyde condensate.
11. A coating composition in which the resinous vehicle consists essentially of
   (1) an alkyd resin-aminoplast resin composition containing from about 5 to about 60 percent by weight of alkylated condensation product of formaldehyde with melamine, urea or benzoguanamine, and
   (2) from about 3 percent to about 25 percent, based on the total weight of (1) and (2) herein, of an aromatic reaction product of a xylene-formaldehyde condensate and a polyglycidyl ether of a polyhydric compound.
12. The composition of claim 11 in which said polyglycidyl ether is an epichlorohydrin-para, para′-isopropylidene-diphenol reaction product having an epoxide equivalent of from about 1650 and about 2050.
13. An article having a surface coated with an adherent cured layer of the coating composition of claim 1.

References Cited

UNITED STATES PATENTS

| 2,579,331 | 12/1951 | Martin | 260—52 |
| 2,816,084 | 12/1957 | Nowacki | 260—834 |
| 2,825,712 | 3/1958 | Witzel | 260—838 |
| 3,133,032 | 5/1964 | Jen et al. | 260—21 |
| 3,245,925 | 4/1966 | Watson | 260—842 |

FOREIGN PATENTS 1,370,404  7/1964  France.

DONALD E. CZAJA, Primary Examiner

R. W. GRIFFIN, Assistant Examiner

U.S. Cl. X.R.

117—132, 167; 260—21, 22, 32.8, 33.4, 33.6, 830, 831, 834, 835, 842, 850